A. MASSIE.
CHURN.
APPLICATION FILED JUNE 23, 1909.
959,367.  Patented May 24, 1910.
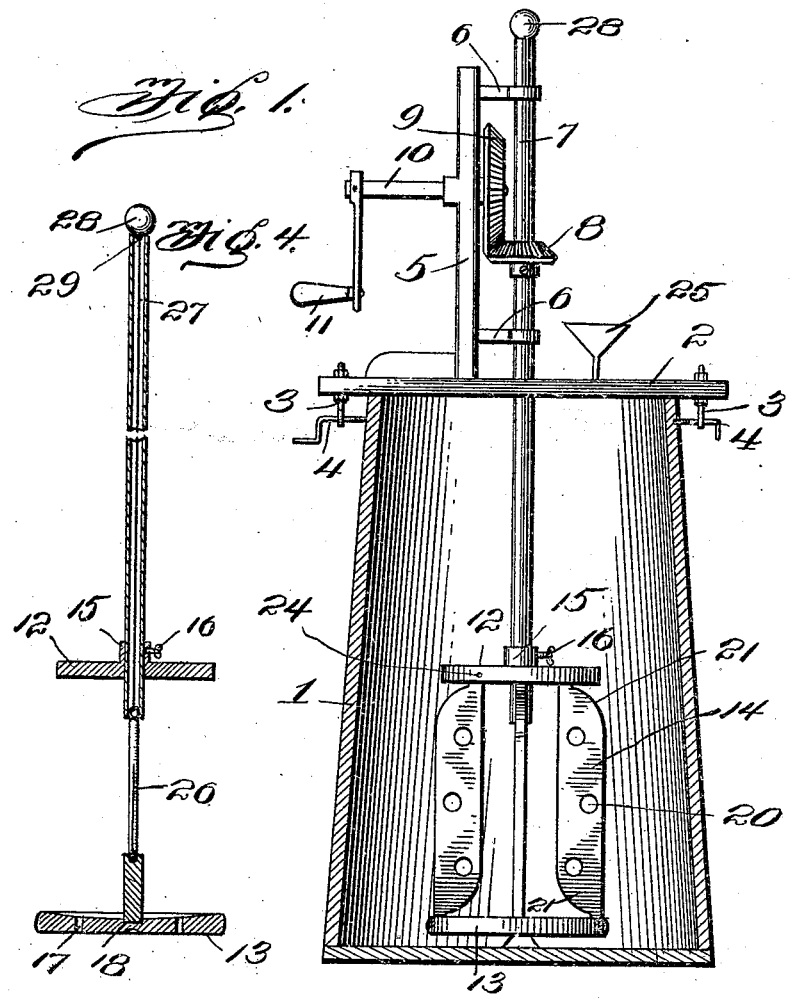
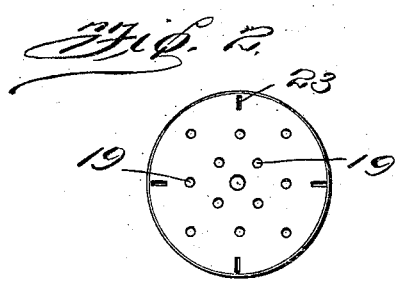
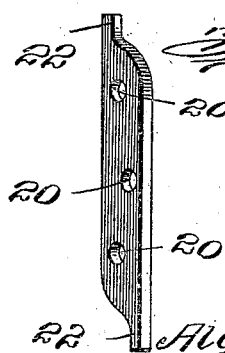
Witnesses  
Inventor  
Alcinous Massie.  
By Victor J. Evans  
Attorney

UNITED STATES PATENT OFFICE.

ALCINOUS MASSIE, OF NASHVILLE, OHIO, ASSIGNOR OF ONE-HALF TO MICHAEL J. WOLF, OF LOUDONVILLE, OHIO.

CHURN.

959,367. Specification of Letters Patent. Patented May 24, 1910.

Application filed June 23, 1909. Serial No. 503,897.

*To all whom it may concern:*

Be it known that I, ALCINOUS MASSIE, a citizen of the United States, residing at Nashville, in the county of Holmes and State of Ohio, have invented new and useful Improvements in Churns, of which the following is a specification.

This invention relates to churns of the rotary dasher type.

One object of the invention is to provide a dasher embodying blades of novel construction and removably held in a novel manner, to permit of the parts of the dasher being readily disassembled for cleansing purposes.

Another object of the invention is to provide a dasher which will serve the function of a gatherer by which a large amount of the butter may be removed from the churn at the completion of the churning operation and the skimmed milk simultaneously drained therefrom.

Still another object of the invention is to provide a thermometer by which the temperature of the body of the cream may be determined at any time, so that the cream may be tempered whenever necessary.

With these and other objects in view, the invention consists of the features of construction, combination and arrangement of parts hereinafter fully described and claimed, reference being had to the accompanying drawing, in which:—

Figure 1 is a vertical section through a churn embodying my invention. Fig. 2 is a top plan view of the lower dasher head or disk. Fig. 3 is a perspective view of one of the dasher blades. Fig. 4 is a vertical section through the hollow shaft and dasher.

Referring to the drawing, 1 designates the churn casing, which may be of any preferred form and which is adapted to be closed at the top by a removable lid or cover 2. This cover is provided with depending bearings 3 having threaded orifices for the reception of clamping screws 4, said screws being provided with pointed ends to engage the churn body, whereby the lid may be firmly fastened in position.

Rising from the lid is a post or standard 5 provided upon one side with bearings 6 for a vertical dasher shaft 7, which extends downwardly through an opening in the lid 2 a suitable distance into the body or casing 1. On said shaft is a beveled gear 8 meshing with a corresponding drive gear 9 on a horizontal drive shaft 10 journaled in the standard and provided with an operating crank handle 11, by which rotary motion may be imparted to the shaft.

The lower end of the shaft carries a dasher consisting of upper and lower heads or disks 12 and 13 and an intermediate series of blades 14. The head or disk 12 is provided with a collar 15 by which it is fitted upon the shaft 7 immediately above the lower end thereof, said collar carrying a set screw 16 for clamping said head to the shaft.

The lower dasher head or disk 13 is provided with a concaved or dished upper face 17 having a central seat recess 18, and in said head are formed annular rows or series of drainage openings 19. Each blade 14 is approximately of oblong rectangular form and provided with cream passages or apertures 20, the opposite inner and outer end edges of the blades being, however, curved, as indicated at 21 to diminish its resistance to its passage through the cream, said end edges being formed with tongues or offsets 22 which fit within sockets or recesses 23 formed within the opposing faces of the heads 12 and 13. Set screws or other equivalent 24 are provided upon the heads to secure the tongues thereto, by which the parts of the dasher are detachably united, so that they may be disassembled after each churning operation to permit them to be thoroughly cleansed.

When the churning operation is completed, it will be understood that the lid, dasher and its drive gearing are detached to permit of the removal of the butter and skimmed milk. The construction of the dasher head 13 facilitates the removal of the butter, as its concaved face 17 serves as a gatherer into which a large amount of the butter will settle by gravity when the motion of the dasher is arrested, which butter will be withdrawn with the dasher when the latter is extracted. The openings 19 in the dasher head 13 permit the skimmed milk to drain from the butter contained thereon as soon as the dasher is elevated above the body of skimmed milk as will be readily understood. If desired, the lid 2 may be provided with a funnel or other receptacle 25 for the introduction of hot or cold water into the churn casing to temper the cream during the process of churning as circumstances may require.

In order that the temperature of the body of cream may be determined at any time, so that the cream may be accurately tempered, the shaft 7 is made hollow for the passage of a thermometer 26 or other temperature indicator, which is adapted to rest at its lower end in the seat recess 18 of the head 13, by which it will be sustained and exposed at a point where it will be influenced by the temperature of the body of cream to accurately indicate the same. The said thermometer is attached to the lower end of a rod or other extracting device 27 extending upwardly to the exterior through the hollow shaft and provided at its outer end with a finger piece 28 and a stop 29, the latter being adapted to engage the upper end of said shaft to limit the inward movement of the rod. At intervals during the operation of churning, the operator may, by withdrawing the thermometer in an obvious manner, readily and conveniently determine the temperature of the cream, so that the latter may be tempered to facilitate the production of butter.

From the foregoing description, the construction and mode of operation of my improved churn will be readily understood and its conveniences appreciated. Parts of the invention may be applied to churns of ordinary construction, so that the invention is not limited to the exact details shown, but may be varied within the scope of the appended claims.

I claim:—

1. A churn comprising a casing, a dasher operating therein, a hollow shaft connected with the dasher, a thermometer, and means for inserting and withdrawing the thermometer through the hollow shaft.

2. A churn comprising a casing, a hollow shaft extending therein, a dasher carried by said shaft, a thermometer carried by the dasher, and means for extracting said thermometer through said shaft for inspection.

3. A churn comprising a casing, a hollow shaft operating therein, a dasher carried by said shaft and provided with a seat recess, a thermometer resting within said seat recess, and an extracting device connected with the thermometer for withdrawing the same through said hollow shaft.

4. A churn comprising a casing, a shaft operating therein, a dasher carried by the shaft, a thermometer normally supported by the shaft and dasher, and an extracting rod extending through the shaft and connected with the thermometer, whereby the latter may be withdrawn from the casing.

5. A churn comprising a casing, a hollow shaft journaled in and extending within and without the casing, a dasher arranged within the casing and mounted upon the lower end of the shaft, gearing connected with the upper end of the shaft for imparting rotary motion thereto, a thermometer inclosed by the blades of the dasher and adapted to be supported by a portion of said dasher, a rod extending through the hollow shaft and connected with said thermometer, and a handle upon the upper end of the rod adapted to rest upon and close the upper end of the shaft, said rod and handle providing a means by which the thermometer may be inserted into the casing and withdrawn therefrom through said hollow shaft.

In testimony whereof I affix my signature in presence of two witnesses.

ALCINOUS MASSIE.

Witnesses:
 CLYDE E. SWAGGARD,
 DALTON MILEY.